United States Patent [19]

Ort

[11] 4,232,140
[45] * Nov. 4, 1980

[54] PROCESS FOR POLYMERIZING OLEFINS

[75] Inventor: Morris R. Ort, Wilbraham, Mass.

[73] Assignee: Cities Service Company, Tulsa, Okla.

[*] Notice: The portion of the term of this patent subsequent to May 11, 1993, has been disclaimed.

[21] Appl. No.: 953,715

[22] Filed: Oct. 23, 1978

Related U.S. Application Data

[62] Division of Ser. No. 573,695, May 1, 1975, abandoned.

[51] Int. Cl.$^3$ ............................ C08F 2/34; C08F 4/02; C08F 10/02
[52] U.S. Cl. .............................. 526/129; 252/429 B; 526/124; 526/125; 526/144; 526/348; 526/352; 526/901
[58] Field of Search ................................. 526/129, 144

[56] References Cited

U.S. PATENT DOCUMENTS

| 3,051,690 | 8/1962  | Vandengerg     | 526/159 |
| 3,301,834 | 1/1967  | Christman      | 526/143 |
| 3,349,064 | 10/1967 | Gumboldt et al.| 526/143 |
| 3,354,139 | 11/1967 | Vandengerg     | 526/144 |
| 3,622,548 | 11/1971 | Emde et al.    | 526/143 |
| 3,718,635 | 2/1973  | Tomoshige et al.| 526/124 |
| 3,772,261 | 11/1973 | Faltings et al.| 526/159 |
| 3,784,539 | 1/1974  | Ort            | 526/153 |
| 3,956,255 | 5/1976  | Ort            | 526/129 |

FOREIGN PATENT DOCUMENTS 1059865  2/1967  United Kingdom ..................... 526/144

OTHER PUBLICATIONS

Christman, Journal of Polymer Science, Part A-1, vol. 10, pp. 471-487 (1972).
Gumbaldt et al., Die Makromolekulare Chemie, 101, (1967) pp. 229-245 (1967).

Primary Examiner—Edward J. Smith
Attorney, Agent, or Firm—Patricia J. Hogan

[57] ABSTRACT

Trichlorofluoromethane is used as a promoter in the polymerization and copolymerization of ethylene with supported Ziegler-type vanadium compound/alkylaluminum compound catalysts in the presence of hydrogen. The use of the promoter leads to the formation of non-rubbery, semi-crystalline polymers in high yields, does not alter the basic molecular weight distribution of the polymers, permits independent control of molecular weight by hydrogen, and imparts no significant level of halogen to the product.

8 Claims, No Drawings

PROCESS FOR POLYMERIZING OLEFINS

CROSS-REFERENCE TO RELATED APPLICATION

This application is a division of copending application Ser. No. 573,695, filed May 1, 1975, now abandoned.

SUMMARY OF THE INVENTION

The invention is an improved process for preparing non-rubbery, semi-crystalline polymers and copolymers by contacting an ethylene-containing stream with a supported catalyst comprising (a) a vanadium chloride and (b) at least one alkylaluminum compound of the formula $R_nAl(OR)_{3-n}$, wherein R is an alkyl group containing 1-12 carbons and n is 0.5-3.0, on (c) an anhydrous inert inorganic support material under gas-phase polymerization conditions in the presence of hydrogen. In accordance with the invention, improved yields are obtained by conducting the polymerization in the presence of trichlorofluoromethane as a promoter.

DETAILED DESCRIPTION

The ethylene-containing stream employed in the practice of the invention may contain ethylene as the sole monomer, or it may comprise a mixture of ethylene and one or more alpha-olefins containing 3–8 carbons, e.g., propylene, butene-1, hexane-1, etc.

The vanadium chloride of the catalyst may be any of the vanadium chlorides conventionally used in Ziegler-type catalyst systems, e.g., vanadium tetrachloride and/or vanadium trichloride. However, it is preferably vanadium oxytrichloride.

As indicated above, the reducing component of the catalyst may be any one or more alkylaluminum compounds corresponding to the formula $R_nAl(OR)_{3-n}$, wherein n is 0.5–3 and R is an alkyl group containing 1–12 carbons, e.g., methyl, ethyl, propyl, isopropyl, n-butyl, isobutyl, n-pentyl, isopentyl, t-pentyl, hexyl, etc. Exemplary of suitable alkylaluminum compounds are triethylaluminum, tripropylaluminum, tributylaluminum, triisobutylaluminum, trioctylaluminum, tridodecylaluminum, ethylaluminum diethoxide, diethylaluminum ethoxide, and the mixtures of ethylaluminum diethoxide and diethylaluminum ethoxide known as ethylaluminum sesquiethoxide. Mixtures of an alkylaluminum and an alkylaluminum alkoxide are particularly suitable, especially those compositions prepared as described and claimed in U.S. Pat. No. 3,784,539 (Ort), the disclosure of which is incorporated herein by reference.

The catalysts may be employed as such but are preferably supported on a suitable substrate or carrier material. This support may be any inert anhydrous material which is suitable for the adsorption and/or deposition of the catalyst components thereon and which remains unaltered and does not soften and/or agglomerate under catalyst preparation or polymerization conditions. Suitable materials include, for example, anhydrous silica, alumina, silicaalumina mixtures, calcium carbonate, calcium chloride, sodium chloride, charcoal, carbon black, and the like, or such materials used in conjunction with a finely-divided or granular polymer, such as polyethylene, ethylene-propylene copolymer, etc., which is preferably the same type of polymer as the intended product of the process.

Such supports should generally have surface areas of about 0.1–800 m² or more per gram and preferably have surface areas of about 0.5–500 m²/gram. The particle size of the catalyst support is not critical but may be varied to control the particle size and melt index of the polymeric product. Generally, for efficient operation, the catalyst support should have an average particle size of about 30–600 microns, with the smaller particle sizes being employed when lower melt index products are desired and the larger particle sizes being employed when higher melt index products are desired.

Silica gel is a preferred catalyst support, and this support is most preferred when it has been treated or reacted with an alkylaluminum or alkylaluminum alkoxide prior to use in order to increase its activity. Compounds and conditions suitable for this treatment of a silica gel support are more fully disclosed in U.S. Pat. No. 3,956,255 (Ort), the teachings of which are incorporated herein by reference.

Particularly preferred catalysts for use in the practice of the invention are (1) the catalyst composition of U.S. Pat. No. 3,784,539 (Ort) supported on treated silica gel and (2) the catalyst obtained by reacting an inorganic catalyst support material having reactive surface hydroxyl groups, such as silica gel, with the alkylaluminum component and then reacting this reaction product with the vanadium component.

The quantities of the components of the catalyst may be varied but are generally such as to provide an alkylaluminum compound/vanadium compound mole ratio of at least 0.3/1, preferably about 0.3–1000/1, most preferably about 1–500/1. When an alkoxide is also employed, the alkoxide/vanadium mole ratio may likewise vary from about 0.1–100/1, preferably about 0.5–50/1.

In the practice of the invention, the catalyst is effective when used in conventional amounts, e.g., about 0.01–5% by weight of monomer. However, the use of such large amounts of catalyst defeats an advantage of the invention, i.e., the production of high yields of polymer with such small amounts of catalyst that it is unnecessary to remove catalyst residues from the polymer. It is therefore preferred to use an amount of catalyst which provides about 0.000001–0.005%, most preferably about 0.00001–0.0003%, by weight of vanadium, based on the weight of monomer.

The polymerization reaction can be conducted over a wide range of temperatures from 0° to 120° C. and even higher if desired. However, the reaction temperature is preferably maintained at about 65°–115° C. Likewise, while atmospheric and subatmospheric pressures can be used, superatmospheric pressures are preferred. The promoted catalyst of the invention is effective under all these conditions.

The promoter of the invention may be introduced into the polymerization in a variety of ways and in either liquid or gaseous state. For example, it may be added with a monomer stream or directly to the reactor, or it may be added to the recycle system. Also, it may be added continuously or semicontinuously, since its effect is of substantial duration. With semicontinuous addition, it is generally more convenient and therefore preferable to add the promoter to a large incoming stream, such as monomer, or directly to the reactor. With continuous addition, it is often preferable to dilute the promoter with monomer or solvent to facilitate accurate metering and then feed the dilute stream into the reactor or into one of its incoming streams.

The promoter is used in amounts such as to provide a promoter/vanadium mol ratio of 1–5000/1. Within this range there are preferred ratios at which the yield of polymer per gram of vanadium is optimum. These preferred ratios vary with the specific catalyst, pressure, temperature, Al/V ratio, and impurities present but are in the range of 40–1500/1 for the catalysts described herein.

The following examples are given to illustrate the invention and are not intended as a limitation thereof.

EXAMPLE I

CONTROL

Part A—Treatment of Catalyst Support

Charge a small fluid-bed catalyst preparation unit with a dehydrated silica gel having a particle size of about 50–65 microns and containing about 1.4 mmol of available hydroxyl groups per gram on its surface. Fluidize the silica gel with dry, oxygen-free nitrogen at a temperature of about 40° C. while adding a hexane solution of diethylaluminum ethoxide (DEAE) dropwise onto the silica gel to provide one millimole of DEAE per gram of silica gel. After completing the DEAE addition, evaporate the hexane from the fluid bed.

Part B—Preparation of Catalyst

Prepare a polymerization catalyst by:
(1) sequentially charging 100 ml of hexane and the required amounts of 2 M solutions in hexane of pure vanadium oxytrichloride ($VOCL_3$), aluminum sesquiethoxide (EASE), and triethylaluminum (TEA) to a stirred, nitrogen-blanketed glass vessel to provide a molar ratio of 1/6/3,
(2) stirring the mixture for ten minutes,
(3) feeding the mixture dropwise into the catalyst preparation unit containing the fluidized catalyst support of Part A to form a catalyst containing 1 mmol of vanadium per 12 grams of silica gel,
(4) continuing fluidization until all of the hexane has evaporated and the catalyst is dry, and
(5) diluting the catalyst to 600 ml. total volume with high density polyethylene powder to facilitate feeding to the reactor.

Part C—Polymerization

Charge the catalyst of Part B to a cylindrical reactor adapted to contain a fluidized bed of catalyst and product particles approximately 4 inches in diameter and 2.5–3 feet in depth and to permit the separation and return of entrained particles in unreacted gas by use of a disengaging zone of larger diameter at the top of the bed.

Introduce a stream of ethylene and 4.2% of hydrogen at the bottom of the reactor. Continuously withdraw unreacted or recycle gas from the top of the disengaging zone, pass it through a heat exchanger to maintain a bed temperature of 105° C., and introduce it at the bottom of the reactor at a rate sufficient to maintain the particles in the bed in a highly fluidized state.

Introduce make-up ethylene and hydrogen into the recycle gas line, and feed fresh catalyst particles into the reactor below the top of the bed so as to provide a V feed rate of 0.067 mmol/hour. Add supplemental TEA during the polymerization so as to provide a TEA feed rate of 0.6 mmol/hour. Maintain a reactor pressure of about 500 psig, and continuously withdraw product polyethylene from the bottom of the bed at a rate such as to maintain a constant bed level.

The process results in a net production of 90 grams per hour of a polyethylene having a melt index of 0.93 and an $I_{10}/I_2$ rate of 9.7. The yield is 26 kg of polyethylene per gram of vanadium.

EXAMPLE II

Repeat Example I except for (1) employing an amount of $VOCl_3$/EASE/TEA mixture such as to provide one millimole of vanadium per 24 grams of silica gel, (2) diluting the catalyst to 1200 ml with high density polyethylene powder, (3) using a polymerization temperature of 108° C., a hydrogen concentration of 3.3%, a V feed rate of 0.017 mmol/hour, and a TEA feed rate of 2.4 mmol/hour, and (4) introducing 100 mmol of trichlorofluoromethane per mol of vanadium into the recycle gas along with the ethylene in a separate metered stream.

The process results in a net production of 334 grams per hour of a polyethylene having a melt index of 0.73 and an $I_{10}/I_2$ ratio of 9.6, indicative of a polymer having substantially the same molecular weight and molecular weight distribution as the product of Example I. The yield is 392 kg of polyethylene per gram of vanadium.

EXAMPLE III

Repeat Example II except for (1) treating the silica gel with ethylaluminum diethoxide (EADE) instead of DEAE and (2) using a $VOCl_3$/EADE/TEA catalyst mixture in a mole ratio of 1/12/12, a polymerization temperature of 104° C., a hydrogen concentration of 6.3%, a V feed rate of 0.007 mmol/hour, a TEA feed rate of 6.7 mmol/hour, and a promoter feed rate of 0.2 mmol/hour.

The process results in a net production of 269 grams per hour of a polyethylene having a melt index of 10.4. The yield is 789 kg of polyethylene per gram of vanadium.

EXAMPLE IV

CONTROL

Run a series of polymerizations by repeating Example III except as indicated in Table I. Comparison of the results obtained in Example III with the results given in the table shows that (1) trichlorofluoromethane is more efficacious as a promoter than dichloromethane or dichlorodifluoromethane, (2) melt index is affected by the hydrogen level but not by the promoter or TEA concentration, and (3) TEA concentration does not affect the promotion effect.

TABLE I

| Run No. | 1 | 2 | 3 | 4 |
|---|---|---|---|---|
| mmol V/hr. | .017 | .017 | .017 | .017 |
| mmol TEA/hr. | 4.7 | 4.8 | 2.7 | 4.2 |
| Temp., ° C. | 104 | 103 | 102 | 106 |
| Promoter | $CH_2Cl_2$ | $CH_2Cl_2$ | $CF_2Cl_2$ | None |
| Promoter rate, mmol/hr. | 10 | 5 | 23 | — |
| Polymer net rate, g/hr. | 287 | 227 | <20 | <20 |
| Yield, kgPE/gV | 337 | 262 | <24 | <24 |
| $H_2$ conc., % | 6.3 | 5.1 | 4.8 | 6.4 |
| Melt Index | 10.6 | 7.4 | 1.3 | 8.0 |

EXAMPLE V
CONTROL

Part A—Preparation of Catalyst

Charge about 5.3 grams of dehydrated silica gel to a nitrogen-purged, stirred vessel containing 75 ml of dry, deoxygenated hexane. Add a hexane solution containing 4.2 ml of TEA, and stir for 40 minutes. Then add a hexane solution containing 2 mmol of vanadium oxytrichloride, and continue stirring for 10 minutes. Slowly feed the resulting mixture into the top of a bed of 1200 ml of polyethylene powder which has been dried one hour with nitrogen at 50° C. and which is fluidized with nitrogen at about 50° C. Evaporate the hexane with the fluidizing nitrogen to provide a dried silica-supported catalyst diluted to 1200 ml total volume.

Part B—Polymerization

Polymerize ethylene be repeating Example I, Part C, except for using the catalyst of Part A, a V feed rate of 0.033 mmol/hour, a TEA feed rate of 3.6 mmol/hour, a bed temperature of 95° C., and a hydrogen concentration of 6.1%.

The process results in the production of 113 grams of polyethylene per hour. The yield is 67 kg of polyethylene per gram of vanadium.

EXAMPLE VI

Test the efficacy of trichlorofluoromethane as a promoter by continuing the polymerization of Example V with the modifications indicated in Table II. Introduce the trichlorofluromethane via the cycle gas, and gradually increase its feed rate. Estimate its concentration from the feed and purge rates. The results are shown below.

TABLE II

| Stage No. | 1 | 2 | 3 | 4 |
|---|---|---|---|---|
| mmol V/hr. | 0.017 | 0.017 | 0.017 | 0.017 |
| mmol TEA/hr. | 0 | 1.2 | 0 | 1.2 |
| Avg. promoter rate, mmol/hr. | 3.6 | 10.8 | 15.1 | 21.6 |
| Promoter conc., mmol | 15.1 | 37.2 | 68.5 | 100 |
| Temp., °C. | 97 | 97 | 97 | 96 |
| Polymer net rate, g/hr. | 230 | 277 | 358 | 246 |
| Yield, kgPE/gV | 271 | 326 | 422 | 290 |
| $H_2$ conc., % | 5.9 | 7.3 | 7.4 | 7.0 |
| Melt index | 0.19 | 0.19 | 0.20 | 0.13 |

EXAMPLE VII

Prepare an ethylene-propylene copolymer in the polymerization unit of Example I, using the same type of procedure as described in that example. Employ the catalyst of Example III, and feed it at a steady rate so as to provide 0.017 mmol vanadium/hour while averaging a TEA addition of 4 mmol/hour. Introduce trichlorofluoromethane to the cycle gas in a stream of propylene containing about 650 ppm of the promoter, and feed this stream to the cycle gas at a rate such as to provide an average of 3.9 mol % propylene in the cycle gas. Maintain an average of about 4.1 mol % hydrogen in the cycle gas, and maintain the polymerization bed temperature at about 108° C. Over a 15-hour period the process results in a net production of 465 grams per hour of a semicrystalline ethylene-propylene copolymer. The yield is 547 kg of copolymer per gram of vanadium.

When the copolymerization is repeated without the use of a promoter, the polymerization rate is below detectability limits, i.e., the yield is less than 20 kg/gram of vanadium.

EXAMPLE VIII
CONTROL

Conduct two runs wherein ethylene is polymerized in the polymerization unit of Example I, using the same type of procedure described in that example, but using the conditions shown in Table III and a catalyst of the type described in Example V, i.e., a catalyst prepared by reacting a silica gel support with TEA and then reacting the product with vanadium oxytrichloride.

Evaluate the polyethylene products with respect to melt rheology from samples stabilized with about 0.06% by weight of a 2:1 mixture of glyceryl monostearate and 2,6-di-t-butyl-p-cresol. Measure the melt viscosity on an Instron capillary rheometer at 3 sec.$^{-1}$ ($V_3$) and 300 sec.$^{-1}$ ($V_{300}$) using a 0.005"×2"×90° capillary. Measure the die swell or % memory (puff-up due to die swell) at 600 sec.$^{-1}$ using a 0.025"×0.1"×30°×10° capillary. Determine chloride residues by x-ray fluorescence.

The results of the polymerizations and the polymer properties are shown in Table III.

TABLE III

| Run No. | 1 | 2 |
|---|---|---|
| Polymerization Cond. | | |
| mmol V/hr. | 0.008 | 0.008 |
| mmol TEA/hr. | 1.2 | 1.2 |
| Temp., °C. | 106.5 | 106.8 |
| $H_2$ conc., % | 7.4 | 7.1 |
| Yield, kgPE/gV | 105 | 90 |
| Polymer Properties | | |
| Melt index | 0.77 | 0.55 |
| $V_3$, kilopoise | 58 | 82 |
| $M_{6000}$, % | 162 | 154 |
| $V_3/V_{300}$ | 8.9 | 10.3 |
| Cl residue, ppm | <10 | <10 |

EXAMPLE IX

Conduct a series of polymerizations by repeating Example VIII except for using trichlorofluoromethane as a promoter and utilizing the conditions shown in Table IV. The results of the polymerizations and the polymer properties are shown in the table.

TABLE IV

| Run No. | 1 | 2 | 3 | 4 | 5 |
|---|---|---|---|---|---|
| Polymerization Conditions | | | | | |
| mmol V/hr. | 0.008 | 0.008 | 0.008 | 0.008 | 0.008 |
| mmol TEA/hr. | 0.5 | 0.5 | 0.6 | 0.4 | 0.5 |
| Promoter rate, mmol/hr. | 0.1 | 0.1 | 0.1 | 0.1 | 0.1 |
| Temp., °C. | 95 | 105 | 105 | 105 | 105 |
| $H_2$ conc., % | 12 | 14.1 | 14.6 | 10.5 | 14.3 |
| Yield, kgPE/gV | 300 | 430 | 500 | 420 | 540 |
| Polymer Properties | | | | | |
| Melt index | 0.51 | 0.65 | 0.83 | 0.93 | 1.08 |
| $V_3$, kilopoise | 69 | 59 | 52 | 49 | 47 |
| $M_{6000}$, % | 168 | 166 | 168 | 164 | 156 |
| $V_3/V_{300}$ | 11.1 | 10.6 | 10.1 | 9.9 | 10.0 |
| Cl residue ppm | | <10 | <10 | <10 | <10 |

What is claimed is:

1. In a process for preparing non-rubbery, semicrystalline polymers and copolymers by contacting an ethylene-containing stream with a supported catalyst comprising (a) a vanadium chloride and (b) at least one alkylaluminum compound of the formula $R_nAl(OR)_{3-n}$, wherein R is an alkyl group containing 1–12 carbons and n is 0.5–3.0, on (c) an anhydrous inert inorganic support material under gas-phase polymerization conditions in the presence of hydrogen, the improvement which comprises conducting the polymerization in the presence of trichlorofluoromethane.

2. The process of claim 1 wherein ethylene is the only monomer in the ethylene-containing stream.

3. The process of claim 1 wherein the ethylene-containing stream also contains an alpha-olefin containing 3–8 carbons.

4. The process of claim 1 wherein the catalyst is supported on silica gel which has been treated with an alkylaluminum compound of the formula $R_nAl(OR)_{3-n}$, wherein R is an alkyl group containing 1–12 carbons and n is 0.5–3.0.

5. The process of claim 4 wherein the catalyst comprises vanadium oxytrichloride, ethylaluminum diethoxide, and triethylaluminum, and the silica gel support has been treated with ethylaluminum diethoxide.

6. The process of claim 1 wherein the catalyst comprises vanadium oxytrichloride and triethylaluminum on a silica gel support and has been prepared by reacting silica gel with triethylaluminum and reacting the resultant product with vanadium oxytrichloride.

7. The process of claim 1 wherein the mol ratio of trichlorofluoromethane to vanadium is in the range of about 1–5000/1.

8. The process of claim 7 wherein the ratio is about 40–1500/1.

* * * * *